United States Patent [19] [11] Patent Number: 4,764,179
Yajima [45] Date of Patent: Aug. 16, 1988

[54] AUTOMATIC TENSION SPRING MOUNTING DEVICE

[75] Inventor: Yutaka Yajima, Akishima, Japan

[73] Assignee: Tachi-S Co., Ltd., Tokyo, Japan

[21] Appl. No.: 4,034

[22] Filed: Jan. 16, 1987

[51] Int. Cl.⁴ .................................. B23P 19/04
[52] U.S. Cl. .................................... 29/33 K; 29/225; 29/227; 29/700; 29/822; 198/430; 414/225
[58] Field of Search ............ 29/33 K, 225, 227, 283, 29/700, 791, 793, 822; 414/222, 225, 226; 198/430, 953

[56] References Cited
U.S. PATENT DOCUMENTS
4,653,185 3/1987 Kajima et al. .................. 29/227 X
4,715,114 12/1987 Yajima ............................ 29/227 X FOREIGN PATENT DOCUMENTS
5882 9/1972 Japan .

Primary Examiner—Mark Rosenbaum
Assistant Examiner—Frances Chin
Attorney, Agent, or Firm—Oldham & Oldham Co.

[57] ABSTRACT

An automatic tension spring mounting device used for spreading a pad receive member onto a seat frame in a seat for a vehicle such as an automobile is disclosed. In the device, there are provided a plurality of guide means respectively located so as to correspond to engagement portions in the seat frame and adapted to be able to restrict tension springs each having end hooks in the two ends thereof in the peripheral and longitudinal directions thereof. When mounting the tension springs, the end hooks of the tension springs can be guided into the seat frame engagement portions by the guide means.

7 Claims, 3 Drawing Sheets

AUTOMATIC TENSION SPRING MOUNTING DEVICE

BACKGROUND OF THE INVENTION

1. Field of the Invention

The present invention relates to an automatic tension spring mounting device for automatically mounting tension springs which are used to suspend a pad receive member on a seat frame in a vehicle seat or the like.

2. Description of the Prior Art

In a seat for use in a vehicle or the like, there is employed a cushion structure. A typical example of such cushion structure is disclosed in Japanese Utility Model Publication No. 5882 of 1972.

Specifically, in the above disclosed cushion structure, as shown in FIG. 1, between front and rear frames (1a), (1b) of a seat frame (1) located within a seat, there are provided a plurality of wires (3) so as to extend between two side members (2a), (2b), and a separation member (4) is inserted between the wires (3) to thereby provide a so-called screen-like pad receive member (5); and, the thus constructed pad receive member (5) is resiliently mounted at the two sides thereof by means of a plurality of tension springs S, so that a comfortable cushion effect can be obtained by the resiliency of the tension springs S.

In mounting the tension springs S for the pad receive member (5) in the seat frame (1), one of two hooks respectively provided symmetrically in the two ends of each of the tension springs S is hitchingly secured to a side member of the pad receive member (5), and the other hook is inserted into an engagement bore (6) formed in the seat frame (1) as the engagement portion thereof. That is, first, in this manner, a required number of the tension springs S are sequentially mounted from one side to one of front and rear portions of the seat frame (1), and after than a required number of tension springs are mounted similarly to the other portion of the seat frame (1).

However, since the above-mentioned operation to mount the tension springs requires a very large amount of labor and is thus not efficient, there has been recently proposed an automatic tension spring mounting device which is arranged such that a plurality of tension springs can be mounted simultaneously by use of an industrial robot.

However, in such simultaneous mounting of a plurality of tension springs using the industrial robot, it is difficult to insert all of the hooks of the tension springs into the engagement bores in the seat frame such that the hooks can accurately correspond to the engagement bores respectively. In order to cope with this problem, each of the engagement bores must be formed so as to have a sufficient diameter, the engagement bores must be located at equal intervals, angles of assembly of the tension springs must be set as parallel to one another, and dimensional errors in the seat frame and in the tension springs must be eliminated almost completely. However, it is found impossible, as a matter of fact, to meet all of these requirements, because the above-mentioned device must be changed to design and the processing costs thereof must be increased so as to satisfy the requirements.

SUMMARY OF THE INVENTION

The present invention aims at eliminating the drawbacks found in the above-mentioned conventional devices.

Accordingly, it is an object of the invention to provide an improved automatic tension spring mounting device which is simple in structure and is also capable of mounting a plurality of tension springs easily and simultaneously.

In order to accomplish this object, according to the invention, there is provided an automatic tension spring mounting device which is arranged such that a plurality of tension springs each having two end hooks can be caught by a transfer device simultaneously and the end hooks of the caught tension springs can be engaged into engagement bores formed in the seat frame as the engagement portions thereof, wherein there are provided guide means for restricting the tension springs in the peripheral direction thereof as well as in the longitudinal direction thereof such that they can correspond to the engagement bores, respectively.

The above-mentioned plurality of tension springs caught by the transfer device, when they are mounted to the seat frame, are restricted by the guide means peripherally and longitudinally thereof and the end hooks thereof are guided into the engagement bores in the seat frame, whereby the plurality of tension springs can be mounted to the seat frame smoothly and simultaneously.

BRIEF DESCRIPTION OF THE DRAWINGS

The above and other related objects and features of this invention will become more apparent upon a reading of the following detailed specification in connection with the accompanying drawings, in which.

DETAILED DESCRIPTION OF A PREFERRED EMBODIMENT OF THE INVENTION

Figure 1:
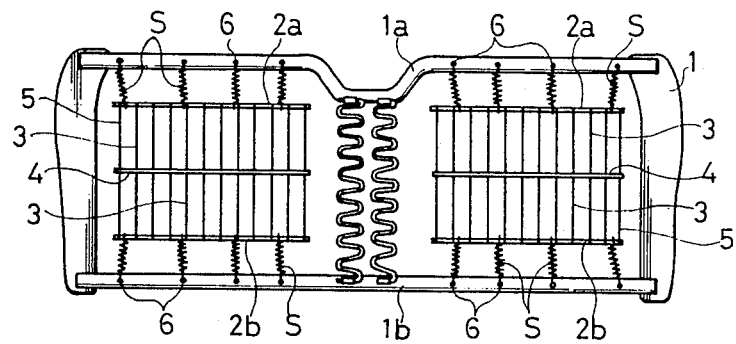
FIG. 1 is a plan view of a seat frame used in a vehicle seat.
Figure 4:
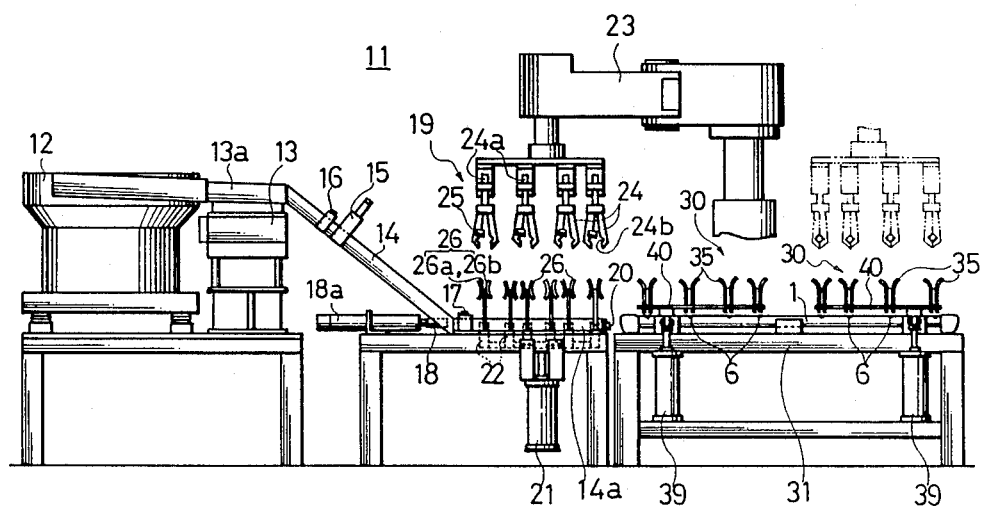
FIG. 4 is a general view of an automatic tension spring mounting apparatus to which the invention is applied.

In FIG. 4, there is illustrated a general view of an apparatus for automatically mounting tension springs S which are used to suspend a pad receive member (5) onto a seat frame (1) as shown in FIG. 1. In this figure, reference character (12) designates a part feeder which has a separation mechanism for separating the tension springs S from one another. Thus, a large number of tension springs S loaded into the part feeder (12) are discharged onto a parallel guide (13a) of a linear feeder (13) after they are individually separated from one another by means of vibration of the part feeder (12), and these tension springs S are further delivered to a supply chute (14) by means of vibration of the linear feeder (13). The tension springs S delivered to the supply chute (14) in this manner are once stocked in a delivery device (15) located midway in the inclined portion of the supply chute (14). When a given number of tension springs S are stocked there, then the delivery device (15) is operated by means of sensing by a sensor (16), so that a required number of tension springs S are caused to drop down.

Figure 5:
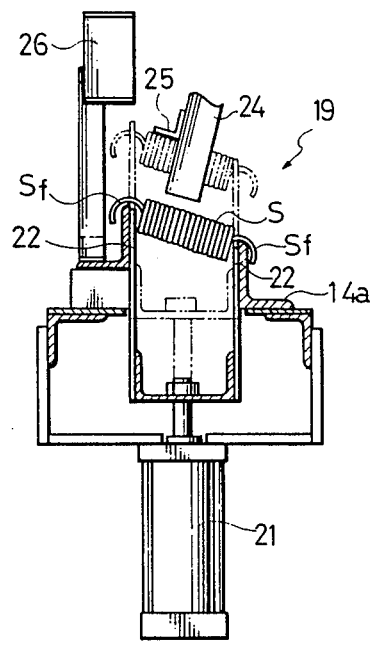
FIG. 5 is a longitudinal sectional view of a tension spring takeout/transfer portion of the automatic tension spring mounting device of the invention; and, FIG. 6 is an explanatory view to show how guide means employed in the invention restricts the peripheral direction of the tension spring.

When the tension springs S are dropped down in this way, then an adjacent switch (17) senses this and operates a cylinder (18a), whereby a push-out member (18) pushed out the tension springs S toward a successive supply portion (14a), which is formed so as to have front an rear portions differing from each other in level, of the supply chute (14) located in a takeout/transfer device (19). By repeating this operation, the tension springs S, while they are inclined, are successively supplied and arranged in line (FIG. 5).

In a condition in which the tension springs S can be successively supplied to the successive supply portion (14a) of the supply chute (14), an adjacent switch (20) provided at the tip end portion of the supply chute (14) senses this condition and operates a cylinder (21) to thereby move takeout means (22) upwardly, so that a given number of tension springs S can be simultaneously taken out at given intervals from the successive supply portion (14a) of the supply chute (14). When the tension springs S are taken out in this manner, then a transfer device (23) is operated, that is, it is now able to catch the given number of tension springs S simultaneously and transfer them to a mounting bed to which is fixed the seat frame (1), which mounting bed will be described afterwards.

In the illustrated embodiment of the invention, there is employed an industrial robot as the transfer device (23). In the tip end portion of the industrial robot there are provided four manipulators (24) which respectively correspond to engagement bores (6) formed in the seat frame (1). These four manipulators (24) can be simultaneously opened and closed by means of operation of their associated cylinders (24a) and are able to grasp the tension springs S at the grab portions (24b) thereof provided inside of the tip end portions thereof, respectively, (FIG. 2).

Each of the manipulator (24) is provided in an inclined manner so as to be able to catch each of the tension springs S taken out inclined as mentioned above in a direction intersecting with the longitudinal direction thereof, while the manipulator (24) is provided with an L-shaped abutment piece member (25) in the grip portion thereof so as to be situated upwardly of the grab portion (24b). The abutment piece member (25) serves to support the upper surface of the tension spring S and thereby make sure the catch of the tension spring S in the intersecting direction when the tension spring S is caught.

Also, upwardly of the successive supply portion (14a) of the supply chute (14) there are provided direction restricting means (26) in such a manner that they correspond to the takeout means (22), respectively. Each of the direction restricting means (26) is composed of a pair of guide wall members (26a), (26b) located opposed to each other. The direction restricting means (26) are formed open in both of the upper and lower end portions thereof, and the distance between the central portions of the two guide wall members (26a), (26b) is defined slightly greater than the diameter of the tension spring S. Due to the provision of the direction restricting means (26), when the tension spring S is caught and lifted up by the manipulator (24) of the transfer device (23), one end hook Sf of the tension spring S is caused to pass between the two guide side walls (26a)(26b), with the result that the tension springs S can be restricted in the peripheral direction thereof and the inclination of the end hooks Sf can also be rectified to a vertical direction. In the rear of, namely, downstream of the takeout/transfer device (19) constructed in the above-mentioned manner, there is provided a tension spring mounting device according to the invention, which is adapted to suspend or spread the pad receive member onto the seat frame (1) by means of the tension springs S.

Figure 2:
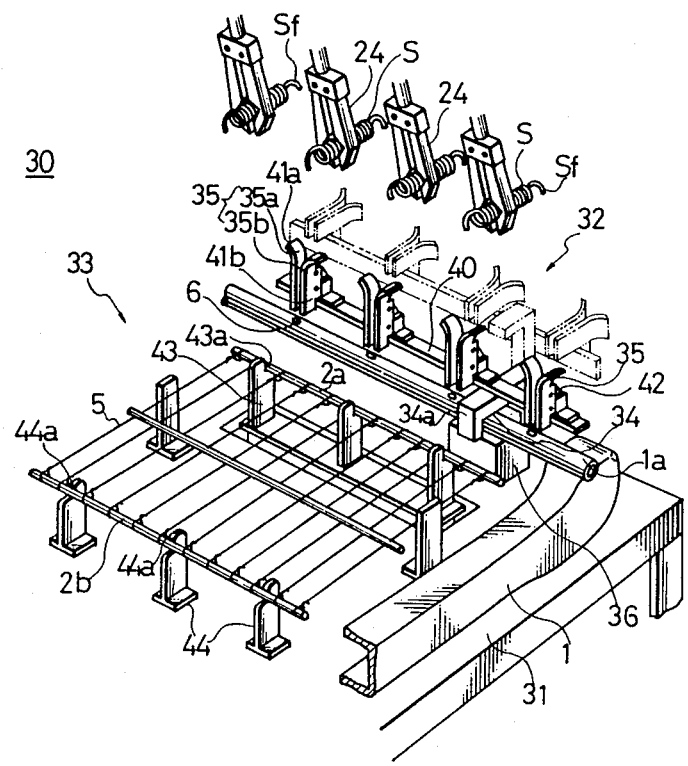
FIG. 2 is a perspective view of main portions of a an automatic tension spring mounting device constructed in accordance with the invention.
Figure 3:
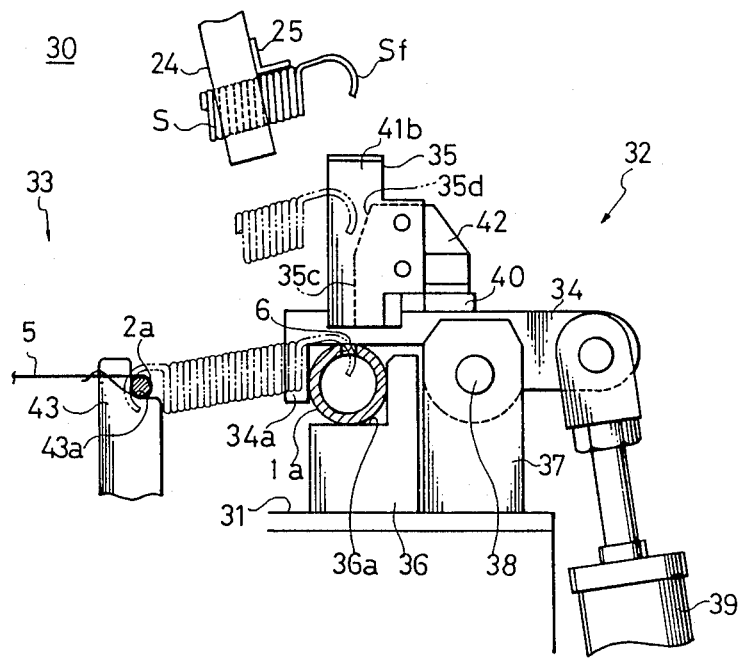
FIG. 3 is a longitudinal sectional view of the above automatic tension spring mounting device of the invention.

The tension spring mounting device (30) of the invention, as shown in FIGS. 2 and 3, comprises two identical positioning/guiding mechanisms (32) respectively disposed in the front and rear portions of a mounting bed (31) to which the seat frame (1) is to be mounted and fixed in order to hold the seat frame (1) as well as guide the tension springs S, and two identical pad receive member spread mechanisms (33) located respectively in the middle portions of the front and rear portions of the mounting bed (31).

Each of the two positioning/guiding mechanisms (32) includes two clamp members (34) for holding the seat frame (1) and a plurality of guide means (35) provided in the clamp members (34) for guiding the tension springs S to the seat frame (1). Each of the clamp members (34) is mounted via a shaft (38) to a bearing (37) erected correspondingly to and outside of one of four support blocks (36) on which front and rear frames (1a), (1b) provided in the seat frame (1) are respectively placed and supported in the respective end portions thereof, so that the clamp member (34) can be raised and lowered correspondingly to the upper surface of the support block (36). The inner end portion of the clamp member (34) is bent to provide an L-shaped engagement portion (34a). The engagement portion (34a) is adapted to cooperate with a stepped engagement surface (36a) provided in the upper surface of the support block (36) to define a grasping space portion. The outer end portion of the clamp member (34) is connected to a cylinder (39) and movable up and down by operating the cylinder.

In this way, four clamp members (34) are provided so as to correspond respectively to the four ends of the front and rear portions of the seat frame (1) placed on the mounting bed (31). Between the forwardly located two clamp members (34) there are provided two support members (40) each located fixedly to the intermediate portions of the two clamp members (34) so as to extend in a direction intersecting with the clamp members (34). Another two support members (40) are disposed similarly between the rearwardly located two clamp members (34). In each of the support members (40) respectively fixed to the four clamp members (34), there are provided a plurality of guide means (35) such that they extend in a direction vertically intersecting with the clamp member (34) as well as correspond to the engagement bores (6) formed in the seat frame (1), respectively. Each of the guide means (35) is composed of a pair of mutually opposed two guide walls (35a), (35b) and an inner wall (35c). The two guide side walls (35a), (35b) are located such that they have a distance between them which is slightly greater than the diameter of the tension spring S so as to provide restricting surfaces for restricting the peripheral direction of the tension-spring S. These two guide side walls are also formed open in the upper end portions thereof, respectively. The inner wall (35c) of the guide means (35) is used as a restricting surface for restricting the longitudinal direction of the tension spring S. Upwardly of the inner wall (35c) of the guide means (35) there is formed an inclined portion (35d).

In the illustrated embodiment of the invention, the guide means (35) is constructed such that a pair of guide pieces (41a), (41b) are mounted to a plate-shaped bracket (42) fixed to the support member (40) in such a manner that they hold the the bracket (42) between them and extend in a direction intersecting with the clamp member (34). The respective inner surfaces of the two guide pieces (41a), (41b) are employed as the guide side walls (35a), (35b), while the inner edge portion of the plate-like bracket (42) is employed as the inner wall (35c) of the guide means (35). Also, the upper portion of the inner edge portion of the plate-like bracket (42) is inclined outwardly and the outwardly inclined portion is used as the inclined portion (35d) of the guide means (35).

In the positioning/guiding mechanism (32) constructed in the above-mentioned manner, the clamp member (34) is kept in a position where it stands up when setting the seat frame (1) to the mounting bed (31). After the seat frame (1) is set onto the support block (36) of the mounting bed (31), if the cylinder (39) is operated to thereby rotate, that is, raise or lower the clamp member (34), then the front and rear frames (1a) and (1b) of the seat frame (1) are held and retained between the engagement portion (34a) of the clamp member (34) and the engagement stepped surface (36a) of the support block (36) into a fixed condition, and the guide means (35), which lie down horizontally while the clamp member (34) is standing up, are respectively made to correspond substantially vertically to the engagement bores (6) with the rotational movements of the clamp member (34).

Also, the pad receive member spread mechanism (33) comprises a plurality of tensile arms (43) located in the forward portion of the mounting bed (31) such that they can be moved by a cylinder (not shown) in an outward and innerward direction, that is, in a direction approaching the front frame (1a) of the seat frame (1) to be fixed to the mounted bed (31), and a plurality of fixed arms (44) which are fixed to the rearward portion of the mounting bed (31), that is, the portion of the mounting bed (31) adjacent to the rear frame (1b). These arms (43), (44) are formed with cutaway engagement portions on the outsides of the tip end portions thereof, respectively, which are designated by (43a), (44a) respectively.

In operation, in the thus constructed pad receive member spread mechanism (33), with the tensile arms (43) being moved inwardly, the pad receive member (5) is retained between the two groups of arms (43) and (44) by bringing the two side members (2a) and (2b) of the pad receive member (5) into engagement with the engagement portions (43a) of the tensile arms (43) and the engagement portions (44a) of the fixed arms (44) respectively. In this condition, by moving the tensile arms (43) outwardly by means of operation of the cylinder (not shown), the side member (2a) of the pad receive member (5) is pulled toward the front frame (1a) to thereby make the pad receive member (5) tensioned, that is, the pad receive member (5) is set at such a distance from the front frame (1a) that the tension springs S can be mounted.

In this way, the tension springs S can be mounted between the seat frame (1) placed and fixed onto the mounting bed (31) and the pad receive member (5) spread and held in the central portion of the seat frame (1). Specifically, the mounting operation of the tension springs S is carried out in the following manner: as mentioned above, the four tension springs 4 that are delivered from the successive supply portion (14a) of the supply chute (14) are vertically lowered from the upper portions of the guide means (35); and the oneside end hooks Sf of the four tension springs S are inserted into their associated engagement bores (6) in the seat frame (1), while the other-side end hooks Sf thereof are brought into engagement with the side members (2a) and (2b) of the pad receive member (5), so that the four tension springs S can be mounted simultaneously.

Figure 6:
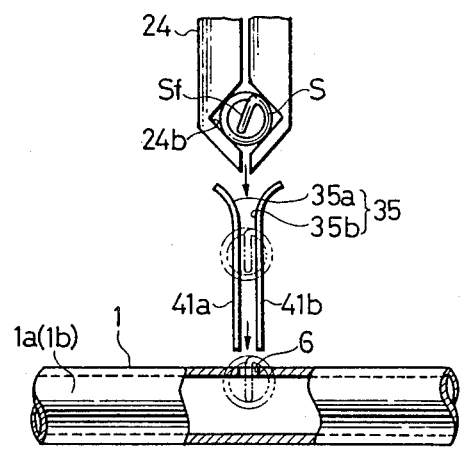

In the above-mentioned tension spring mounting operation, the one end hook Sf of each guide member (35) is restricted in the peripheral direction thereof between the two guide side walls (35a), (35b) when it passes through the guide means (35), so that the end hook Sf can be rectified in the inclination thereof. Also, the outer end edge of the end hook Sf is pressed from the inclined portion (35d) against the inner wall (35c) of the guide means (35) to thereby move the tension spring S in the longitudinal direction thereof against the gripping force of the manipulator (24). That is, the end hooks Sf of the tension springs S can be guided and inserted into the associated engagement bores (6) in the seat frame (1) in such a manner that the variations of the dimensions of the individual tension springs S have been properly absorbed, (FIG. 6).

In this insertion operation to insert the end hooks Sf into the engagement bores (6), as described before, since the tension springs S are transferred and mounted in an inclined manner, the tip ends of the end hooks Sf curved in an arc-shaped manner are faced in a direction easy to insert into the engagement bores (6), so that the insertion of the end hooks Sf can be performed smoothly.

Due to the fact that in mounting the tension springs S the end hook Sf of the tension springs S are guided into the associated engagement bores (6) by the guide means (35) respectively, a plurality of tension springs S can be mounted simultaneously and smoothly, resulting in the reduced time required to mount the tension springs S.

Then, after the tension springs S are mounted to the seat frame (1) in the above-mentioned manner, the transfer device (23) returns to its original position and the the tensile arms (43) of the pad receive member spread mechanism (33) are moved inwardly to thereby release the tension of the pad receive member, so that the pad receive member (5) is now resiliently spread and supported on the seat frame (1) only by the tension springs S.

The foregoing operations complete the spreading of the pad receive member (5) onto the seat frame (1).

As has been described heretobefore, according to the invention, due to the fact that in the present tension spring mounting device there are provided guide means for restricting the peripheral and longitudinal directions of the tension springs in guiding them, the end hooks of the tension springs can be accurately guided into their associated engagement portions and thus the tension springs can be mounted to the engagement portions smoothly, that is, a plurality of tension springs varying from one another in dimensions can also be mounted easily and simultaneously. As a result of this, the time for mounting the tension springs can be greatly reduced over the conventional automatic tension spring mounting device and thus the working efficiency can also be improved.

What is claimed is:

1. An automatic tension spring mounting device in which a plurality of tension springs having a hook at each end thereof are caught simultaneously by a transfer device and said hooks are then mounted to engagement portions formed in a seat frame, respectively, said automatic tension spring mounting device comprising:

a positioning/guiding mechanism disposed in a front portion of a mounting bed to which said seat frame is to be fixedly mounted, and an identical positioning/guiding mechanism disposed in a rear portion of said mounting bed, for holding said seat frame and for guiding said tension springs; and, identical pad receive member spread mechanism respectively interposed between said positioning/guiding mechanisms on said mounting bed, wherein each of said positioning/guiding mechanisms includes two clamp members for holding said seat frame, and a plurality of guide means for guiding said tension springs to said seat frame.

2. An automatic tension spring mounting device as set forth in claim 1, wherein each of said four clamp members is mounted via a shaft to a bearing erected outside of a corresponding one of four support blocks on which end portions of the front and rear frames of said seat frame are respectively placed in such a manner that said clamp member can be raised and lowered correspondingly to an upper surface of said support block, each of said four clamp members includes an inner end portion which is bent in an L-shaped manner to provide an engagement portion, each of said four support blocks is provided with a stepped engagement surface on an upper surface side thereof, said L-shaped engagement portion of said clamp member being cooperable with said stepped engagement surface of said support blocks to provide a grasping space portion therebetween, and each of said four clamp members includes an outer end portion connected to a cylinder provided in said mounting bed, said outer end portion of said clamp member being raisable and lowerable by means of operation of said cylinder.

3. An automatic tension spring mounting device as set forth in claim 1, wherein said guide means are respectively located at such positions as correspond with said engagement portions formed in said seat frame and are adapted to be able to restrict the positioning of said tension springs in their peripheral and longitudinal directions, whereby said hooks of said tension springs can be guided into said engagement portions in said seat frame by said guide means, respectively.

4. An automatic tension spring mounting device as set forth in claim 1, wherein between said four clamp members disposed correspondingly to the end portions of said front and rear portions of said seat frame fixedly mounted on said mounting bed, there are provided four support members extending between and fixed to said clamp members, two of said support members being located between said clamp members disposed correspondingly to two end portions of a front portion of said seat frame, and two of said support members being located between said clamp members disposed correspondingly to two end portions of a rear portion of said seat frame, and also wherein each of said support members is provided with said plurality of guide means extending in a direction intersecting with said clamp members and located so as to correspond respectively to their associated engagement bores formed in said seat frames.

5. An automatic tension spring mounting device as set forth in claim 1, wherein each of said guide means is composed of a pair of mutually opposed guide side walls and an inner wall, said two guide side walls are spaced at a distance from each other slightly greater than the diameters of said tension springs to provide a restricting surface for restricting said tension spring in a peripheral direction thereof, said inner wall of said guide means acts as a restricting surface for restricting said tension spring in the longitudinal direction thereof, and said inner wall is provided with an inclined portion in an upper portion thereof.

6. An automatic tension spring mounting device as set forth in claim 1, wherein each of said guide means is formed of a pair of guide piece members and a plate-like bracket fixed to said support member in such a manner that said pair of guide piece members are disposed respectively on the two sides of said plate-like bracket, positioning said plate-like bracket therebetween, and are then mounted thereto in a manner to extend in a direction intersecting with said clamp member, inner surfaces of said guide piece members being respectively used as guide side walls, an inner edge portion of said plate-like bracket being used as an inner wall, and an upper portion of said inner edge portion of said plate-like bracket being inclined to provide inclined surface.

7. An automatic tension spring mounting device as set forth in claim 1, wherein one of said two pad receive member spread mechanism comprises a plurality of tension arms disposed in the forward portion of said mounting bed and movable by a cylinder inwardly and outwardly of said mounting bed, that is, in a direction approaching said front frame of said seat frame to be fixed to said mounting bed, and a plurality of fixed arms attached to the rearward portion of said said mounting bed adjacent to said rear frame of said seat frame, each of said tension and fixed arms being formed with a cutaway engagement portion in the outer portion of the tip end portion thereof.

* * * * *